United States Patent [19]

Ruetz

[11] Patent Number: 5,500,921
[45] Date of Patent: Mar. 19, 1996

[54] METHOD AND APPARATUS FOR PRINTING HIGH FIDELITY COLOR REPRODUCTIONS OF COLORS DISPLAYED ON A MONITOR

[75] Inventor: Brigitte Ruetz, San Bruno, Calif.

[73] Assignee: Canon Information Systems, Inc., Costa Mesa, Calif.

[21] Appl. No.: 956,300

[22] Filed: Oct. 5, 1992

[51] Int. Cl.⁶ .............................. G06K 15/00; H04N 1/46
[52] U.S. Cl. .............................................. 395/109; 395/131
[58] Field of Search ..................................... 395/109, 131; 358/518, 520, 504, 526

[56] References Cited

U.S. PATENT DOCUMENTS

| | | | |
|---|---|---|---|
| 4,477,833 | 10/1984 | Clark et al. | 358/80 |
| 4,500,919 | 2/1985 | Schreiber | 358/518 |
| 4,758,885 | 7/1988 | Sasaki et al. | 358/80 |
| 4,941,038 | 7/1990 | Walowit | 358/80 |
| 4,967,379 | 10/1990 | Ott | 364/526 |
| 5,107,332 | 4/1992 | Chan | 358/80 |
| 5,185,661 | 2/1993 | Ng | 358/75 |
| 5,237,409 | 8/1993 | Yamaguchi | 358/133 |
| 5,239,370 | 8/1993 | Yamaguchi | 358/518 |
| 5,278,678 | 1/1994 | Harrington | 358/518 |
| 5,319,473 | 6/1994 | Harrington | 358/518 |

FOREIGN PATENT DOCUMENTS

| | | |
|---|---|---|
| 264281 | 4/1988 | European Pat. Off. . |
| 448250 | 9/1991 | European Pat. Off. . |
| 486311 | 5/1992 | European Pat. Off. . |

OTHER PUBLICATIONS

"Color Gamut Matching For Hard Copy", J. Meyer, et al., 1989 SID International Symposium, Digest of Technical Papers, vol. 20, May 18, 1989, pp. 86–89.

Primary Examiner—Raymond J. Bayerl
Assistant Examiner—Tracy M. Legree
Attorney, Agent, or Firm—Fitzpatrick, Cella, Harper & Scinto

[57] ABSTRACT

A method and apparatus for building and using tables which determine the colors to be printed from a device independent color coordinate system. Two tables are built: the first is a printer table for colors in the printer gamut as well as for colors in a typical color monitor gamut, and the second is a border table for colors outside the printer table. The printer table is constructed from a mathematically smooth mapping function for mapping from the device independent coordinate system (such as CIELAB space) to the printer coordinate system, and the mathematically smooth mapping function is determined based on a measurement of the printable colors in the device independent coordinate system. The border table is constructed so as to preserve the hue of unprintable colors but to increase saturation so as to achieve a more natural looking result. Transition colors are added to the printer table outside the printer gamut, smoothing the transition from the edge of the printer gamut to the border table. In use, either the printer table or the border table is selected based on whether the desired color in the device independent coordinate system is within the printer table or outside the printer table.

94 Claims, 11 Drawing Sheets

Microfiche Appendix Included
(37 Microfiche, 1 Pages)

METHOD AND APPARATUS FOR PRINTING HIGH FIDELITY COLOR REPRODUCTIONS OF COLORS DISPLAYED ON A MONITOR

BACKGROUND OF THE INVENTION

This application is being filed with a microfiche appendix of computer program listings consisting of one (1) fiche having thirty-seven (37) frames.

A portion of the disclosure of this patent document contains material which is subject to copyright protection. The copyright owner has no objection to the facsimile reproduction by anyone of the document or the patent disclosure, as it appears in the Patent and Trademark Office patent file or records, but otherwise reserves all copyright rights whatsoever.

FIELD OF THE INVENTION

The present invention pertains to a method and apparatus for building and using look-up tables which determine the colors that a color printer prints in response to requests to print specific colors. The specific colors requested may include colors that are not printable by the printer.

DESCRIPTION OF THE RELATED ART

Recently, as the availability of color monitors and color printers has increased, it is more and more commonplace for a computer user to view a full color image on a color monitor and then to request a full color printout of that image on a color printer.

However, color printers and color monitors form color images differently. Specifically, a color monitor is a light emitting device; colors are formed on color monitors by adding light from three color primaries, generally red, green and blue. Printed images, on the other hand, simply reflect ambient light; colors are perceived by the way ambient light is affected by three subtractive primaries, generally cyan, magenta and yellow (and sometimes black).

These processes are fundamentally different. As a result, the range of colors displayable on the monitor is different from the range of colors printable by a printer. FIG. 1 is the CIE 1931 chromaticity diagram showing the range (or "gamut") of colors displayable by a monitor (area "A") and the range (or "gamut") of colors printable by a printer (area "B"). As seen in FIG. 1, the range of colors displayable on a monitor is generally greater than the range of colors printable by a printer. This is because a monitor is a light emitting device and is able to display colors with greater saturation. There are, however, some low saturation areas such as at area 10 where a printed image, which is light-subtractive, has greater color range than a monitor.

Because of the difference between the ranges of printable and displayable colors, it has not heretofore been possible to print color images which are perceived as faithful reproductions of displayed color images. Specifically, it is simply not possible to print a color in areas like area 11 which are outside the range "B" of printable colors. Accordingly, even though those colors may be seen on color monitors, they cannot be printed on a color printer.

SUMMARY OF THE INVENTION

It is an object of the present invention to address the foregoing difficulties.

In one aspect, the invention involves determining how to print colors which are outside the range of printable colors, such as some of the colors displayed on a color monitor, so that those colors, while not exactly the same as the desired colors, are nevertheless perceived to be faithful reproductions. Generally speaking, printed colors outside the printer gamut are perceived to be faithful reproductions when different colors are printed differently. When different colors are printed differently, color differentiation is preserved even though the actual colors that are printed are distortions of the desired colors.

According to this aspect of the invention, color printing is conducted according to separate printer and border tables. The printer table, which may be arranged as a rectangular grid for discrete luminance values, stores cyan, magenta and yellow values (hereinafter "CMY values") for colors which are within the gamut of a typical color monitor as well as for which are within the gamut of the color printer. The border table, which may be arranged as a wheel for discrete luminance values, gives CMY values to be printed when a color in device independent coordinates is outside the colors in the printer table. The values in the border table preserve hue but may modify lightness so as to increase color saturation. Within the printer gamut, the printer table stores CMY values which accurately reproduce the color in question. Outside the printer gamut, the printer table stores transition values between colors at the edge of the printer gamut and colors in the border table so that the values in the printer table merge smoothly into the saturated values in the border table and so that color differentiation is preserved. If desired, the luminance value may be compressed so that colors with extreme values of luminance are printed with discernable gradations in luminance. To print using the printer and border tables, colors displayed on a color monitor are converted from red, green and blue coordinates (hereinafter "RGB coordinates") to colors in device independent coordinates such as CIELAB coordinates. Thereafter, the device independent coordinates are referred to the printer table and the border table to determine the CMY values that are printed by the printer.

In another aspect, the invention involves building tables for mapping from device independent color coordinates to printer color coordinates. According to this aspect of the invention, the range of printable colors is measured by causing the printer to print a large sample of all printable colors such as a sample consisting of combinations of one quarter of all printable colors for each ink color. The printable colors are measured in the device independent coordinates and, based on that measurement, a mathematically smooth mapping function from the device independent coordinates to the printer coordinates is fit to those measurements. A printer table is calculated for printable colors by referring to the mapping function. A border table is derived for values outside the range of printable colors. The border table is derived for each unprintable color by selecting a printable color whose hue is the same as the unprintable color. The luminance of the printable color may be the same as the luminance of the unprintable color, but more preferably, the luminance is modified so as to increase the saturation of the color that is printed for the unprintable color. The printer table is preferably large enough to cover all colors within a typical color monitor and may include transition values between values at the edge of the printer gamut and values printed according to the border table so as to smooth the transition between those two tables and so as to preserve color differentiation.

This brief summary has been provided so that the nature of the invention may be understood quickly. A more complete understanding of the invention can be obtained by reference to the following detailed description of the preferred embodiment thereof in connection with the drawings which together form a complete part of the specification.

DETAILED DESCRIPTION OF THE PREFERRED EMBODIMENT

Figure 2:
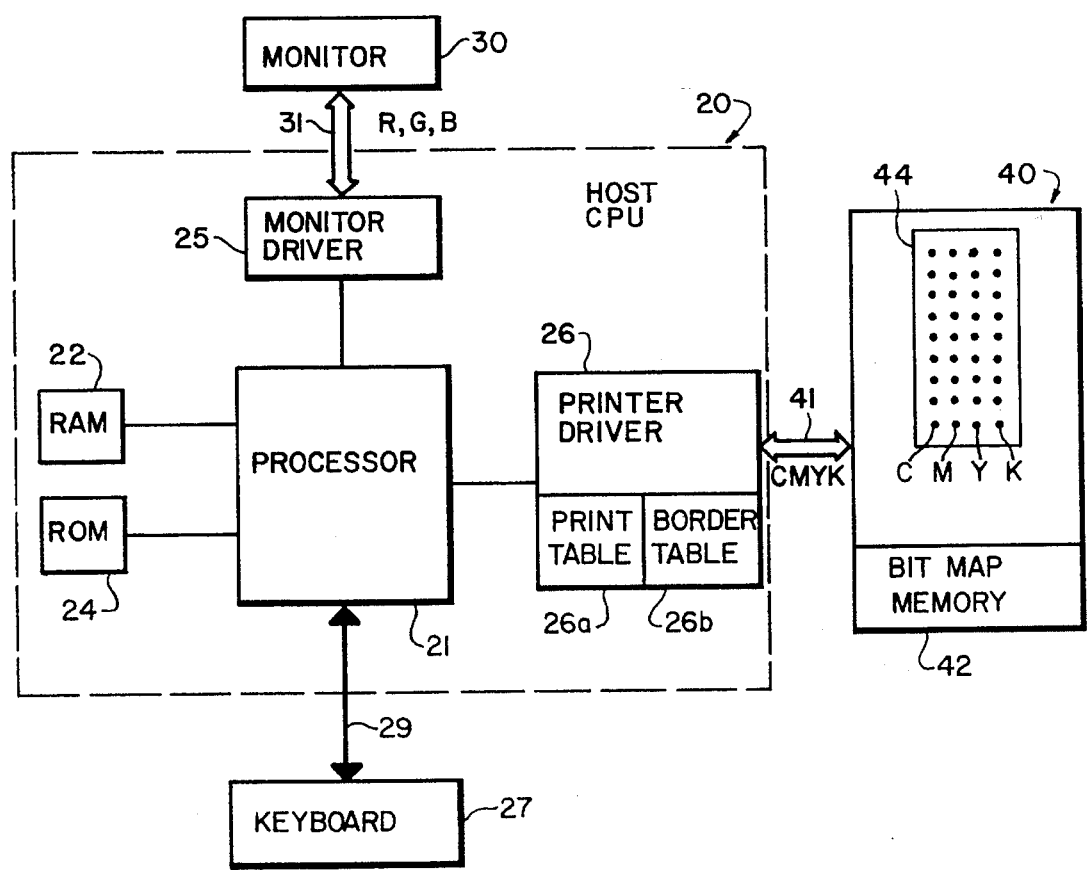
FIG. 2 is a block diagram of a printing apparatus according to the invention.

FIG. 2 is a block diagram of a printing apparatus according to the invention.

As shown in FIG. 2, the printing apparatus includes a host CPU 20, a color monitor 30 and a color printer 40. Host CPU 20 includes a processor 21 such as an 80286 microprocessor, a random access memory ("RAM") 22 which provides working storage area to processor 21, a read only memory ("ROM") 24 which provides static storage for processor 21, monitor driver 25 and a printer driver 26. Host CPU 20 is accessed by an operator via keyboard 27 which is connected through an interface 29 to processor 21. Using the keyboard, an operator can cause processor 21 to execute stored program instructions which cause color images to be displayed on monitor 30 and which cause corresponding color images to be printed on color printer 40.

Other peripheral devices, such as disk drives, tape drives, color video interfaces, color scanner interfaces, etc., may be provided for host CPU 20 but those other devices are not shown in the interest of simplicity. In cooperation with the stored program instructions executed by processor 21, such devices permit, for example, a color image to be scanned into RAM 22 and displayed on monitor 30, the colors in the image to be manipulated, and the resulting image to be printed on printer 40.

In accordance with stored program instructions, processor 21 derives a color image for display on monitor 30. Processor 21 provides the color image to monitor driver 25 which in turn derives RGB values for each pixel in monitor 30. The RGB values are provided via interface 31 to the monitor 30 where those values are displayed.

Upon request, processor 21 also feeds a color image to printer driver 26 for printing by color printer 40. Printer driver 26 derives CMY values for each pixel of the color image based on the color values provided from processor 21. The CMY values are determined in accordance with either a printer table 26a or a border table 26b. The printer table 26a is a table which provides CMY values for all colors that are printable by printer 40. The border table 26b is a table which provides suitable CMY values for colors that are not printable by printer 40. The printer table may also include CMY values for some unprintable colors so as to smooth the transition from printable to unprintable colors. In addition, a black (hereinafter "K") value may also be derived. The CMYK values are fed via interface 41 to printer 40 where they are stored in bit map memory 42 within printer 40. The bit map memory 42 may store a full bit map image of the printed image or it may store only a band or partial bit map image. When sufficient color data is stored in bit map memory 42, a color printer head 44 reciprocates across a platen adjacent to a sheet of paper. In the present embodiment, print head 44 includes 32 ink jet nozzles arranged in a four column by eight row pattern. The nozzles in the first column all eject droplets of cyan ink; the nozzles in the second column all eject droplets of magenta ink; the nozzles in the third column all eject droplets of yellow ink; and the nozzles in the fourth column all eject droplets of black ink. The nozzles are controlled independently in accordance with the color data in bit map memory 42 such that in one reciprocation of print head 44 across the platen, eight rows of pixels are printed.

Figure 3:
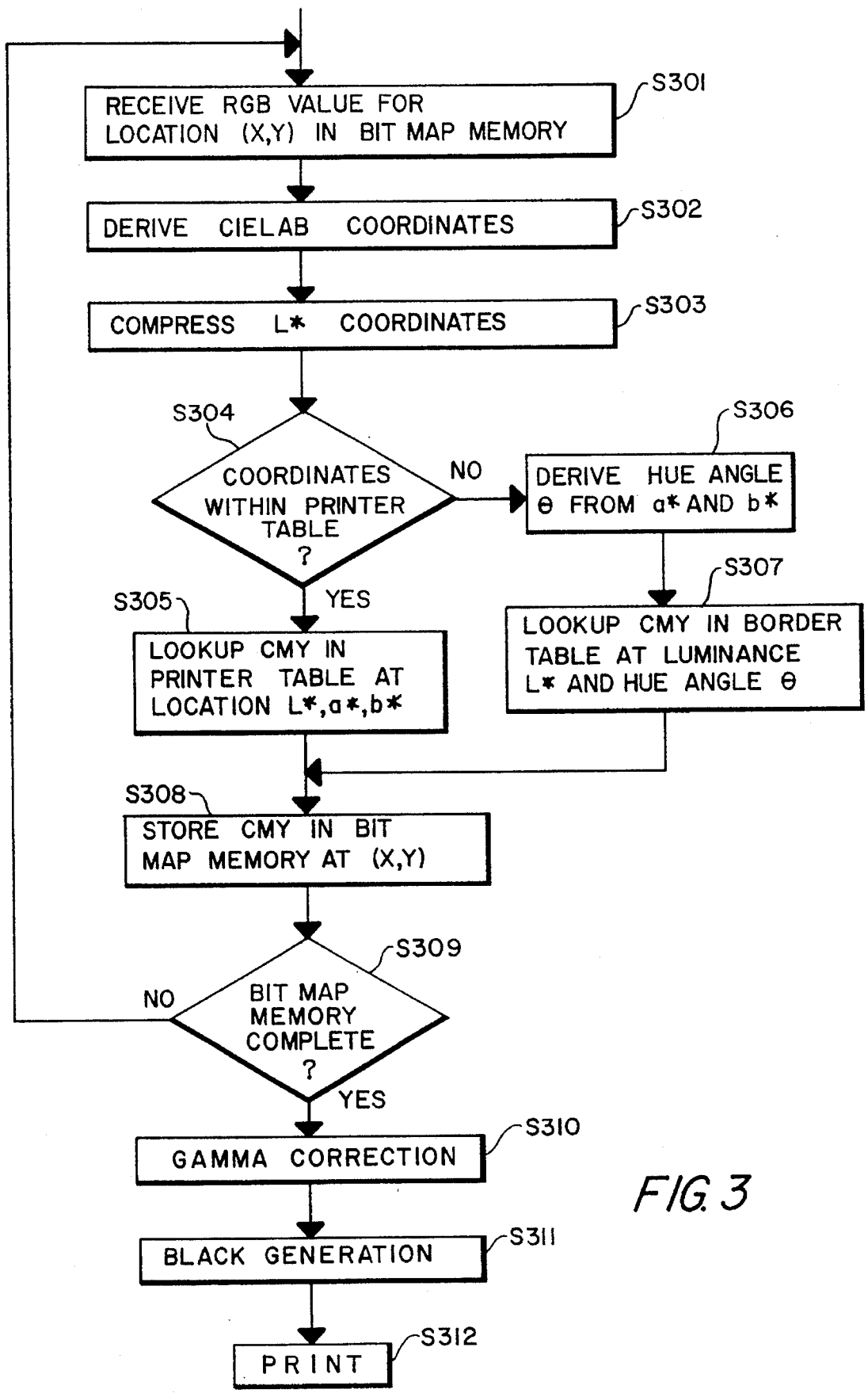
FIG. 3 is a flow diagram showing how a printer driver in the FIG. 2 apparatus selects CMYK values for a color printer.

FIG. 3 is a flow diagram showing how printer driver 26 selects CMYK values from the color data provided by processor 21. In step S301, printer driver 26 receives RGB values for a location (x,y) in bit map memory 42. In step S302, printer driver 26 derives device independent color coordinates from the RGB value. Preferably, the device independent coordinates are CIELAB coordinates. This is because the coordinates in CIELAB space are perceptually uniform such that equal-sized intervals anywhere in CIELAB space correspond to equal-sized changes in perceived color. Moreover, since CIELAB space can be viewed in cylindrical coordinates in terms of hue and luminance, it is an intuitive space which is amenable to defining gamut maps.

In step S303, the luminance coordinate is compressed at the extremes of the L* axis in CIELAB space. Compression step S303 may be performed explicitly by mathematical manipulation of the L* value from step S302 or implicitly by storing modified CMY values in the printer table and the border table. If performed implicitly, which is preferable in some instances, then both the printer table and the border table store pre-compressed values. More particularly, the printer table and border table can be arranged so that the values stored at, for example, luminance L*=99 actually correspond to a luminance of L*=94. Likewise, values stored at, say, luminance L*=7 actually correspond to a luminance of L*=26. Values in the center of the luminance range, from for example L*=38 through 90, remain unmodified. This arrangement results in luminance compression without the need for explicit compression.

While compression step S303 is optional, it is nevertheless preferable to perform since it ensures that colors at extreme values of luminance are printed with perceptible changes in luminance. More particularly, because monitor 30 displays colors with light emitting elements, it can display colors with higher values of luminance than those achievable by printer 40, whose highest value of luminance is limited by the whiteness of the paper upon which the color image is formed. Further still, since monitor 30 can completely turn off its light emitting elements, it can display colors with lower values of luminance than those printable by printer 40, since even black ink reflects some ambient light. Accordingly, to ensure that some color is printed, even at the highest and lowest luminance values, it is preferable to compress the luminance values determined in step S302 into a range that is printable by printer 40.

In step S304, the L*, a* and b* coordinates derived in steps S302 and S303 are inspected to determine whether they fall within the range covered by printer table 26a. If the L*, a*, b* coordinates are within the range covered by printer table 26a, then flow advances to step S305 which looks up the corresponding CMY values in printer table 26a at location L*, a*, b* (actually, the nearest location since only discrete values of L*, a* and b* are stored). On the other hand, if the L*, a*, b* coordinates are not within printer table 26a, then flow advances to step S306 in which the hue angle θ is derived from the a* and b* values according to the following formula:

$$\theta = \arctan(b^*/a^*)$$

Flow then advances to step S307 which looks up corresponding CMY values in border table 26b at the nearest location which corresponds to the luminance L* and the hue angle derived in step S306.

In either event, flow then advances to step S308 in which the CMY values are stored in bit map memory 42 at location (x,y). If desired, the CMY values may be modified before storage, for example, by interpolation, so as to accommodate the difference between the actual L*, a*, b* values stored in the tables and the desired values calculated above.

In step S309, printer driver 26 determines whether the bit map memory has been completed. If the bit map memory has not been completed, then flow returns to step S301 in which the next RGB value is received for the next location (x,y) in bit map memory. On the other hand, if the bit map memory has been completed, or if a sufficient area of the bit map memory has been completed (such as an eight row long band corresponding to the eight rows of ink jet nozzles in head 44), then flow advances to step S310 where gamma correction is performed. Gamma correction adjusts the CMY values in bit map memory so as to achieve a uniform distribution of luminance. In step S311, undercolor removal is performed so as to derive the black value for location (x,y) in bit map memory. Undercolor removal in the present embodiment may be performed by the simple expedient of selecting the minimum value of CMY and assigning that value to the black value. Then, each of the CMY values is adjusted by subtracting the black value from it.

The order of steps S310 and S311 is not critical and those steps may be switched, for example to accommodate a particular color printing technique such as continuous tone, dither techniques or error diffusion.

In step S312, color printing is initiated using the resulting CMYK values.

Figure 4A:
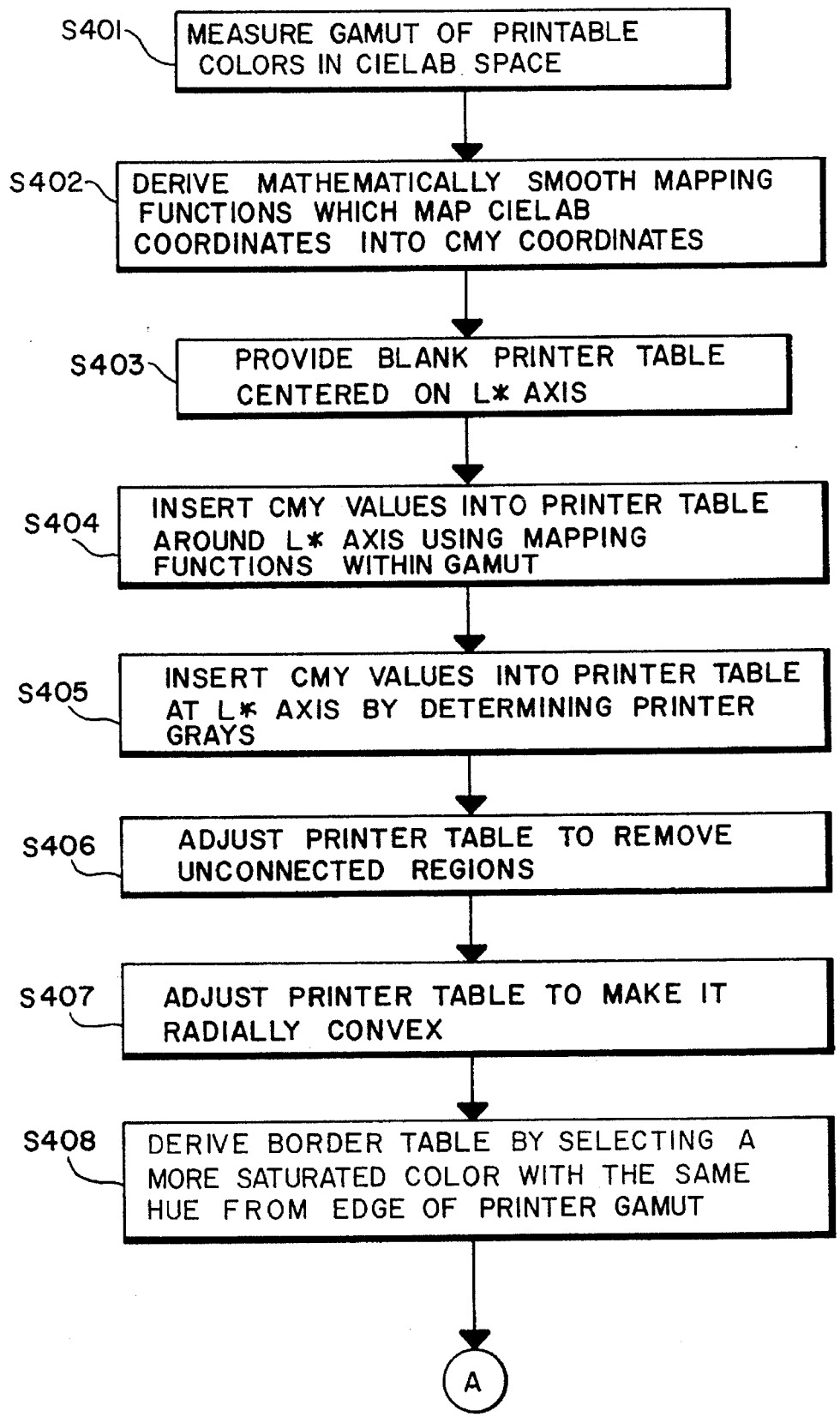
FIGS. 4(a) and 4(b), is a flow diagram for describing how the printer table and the border table are constructed.
Figure 4B:
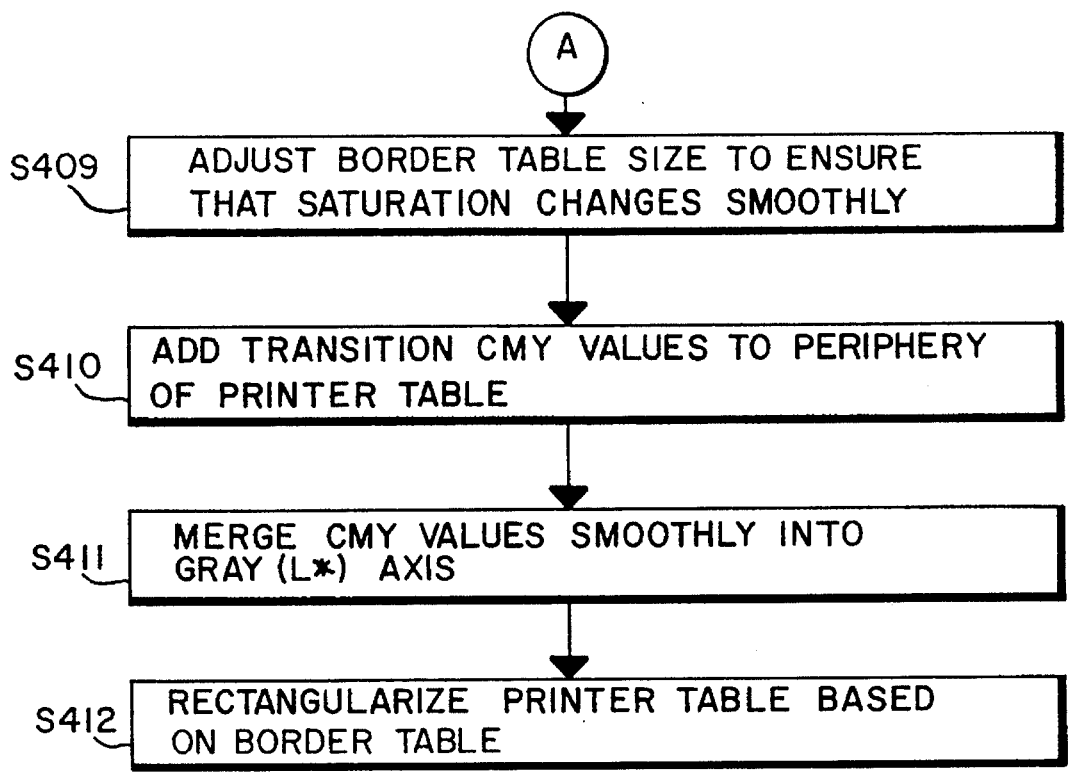
Figure 4:
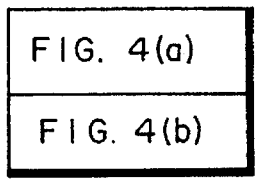
FIG. 4 comprising

FIG. 4 is a flow diagram for describing how the printer table 26a and the border table 26b are constructed. The flow procedures shown in FIG. 4 need only be performed once for each printer, or once whenever it is desired to recalibrate each printer. More preferably, the flow procedures of FIG. 4 are performed only once for a class of printers, such as printers of the same model number, and are provided in software to an operator as part of a factory calibration of the printer.

In step S401, the gamut or range of colors printable by printer 40 is measured. Preferably, this is achieved by printing a very large subset, or a complete set, of all colors printable by printer 40. For example, in the printer used in the present embodiment, each of the CMY and K values may be printed in 65 gradations ranging numerically from 0 through 64. A subset of about one quarter of those values, for each color, are printed. Thus, for example, 17 C values are printed, namely numerical values 0, 4, 8, 12, . . . 64, and 17 M values are printed, and 17 Y values are printed. All possible combinations of those 17 CMY values are printed, yielding 17×17×17=4,913 color patches.

In addition to the foregoing hued colors, all possible gray values, in this case 48 additional gray values over the 17 already printed, are also printed.

With the foregoing sampling of the printer gamut, it will be seen that pure gray colors are printed together with hued colors. Whatever method of sampling is used, this property of pure gray printing should be preserved since proper gray reproduction is a desirable property in color reproduction.

The color of each of the 4,913 color patches and 48 additional gray patches is measured in a device independent color space such as the aforementioned CIELAB color space. Thus, at the end of step S401, for each of the 4,913+48=4,961 unique CMY color combinations, L*, a* and b* coordinates are measured thereby defining the printer gamut.

Step S402 derives mathematically smooth functions which map the CIELAB coordinates into CMY coordinates. In the present embodiment, a cubic least squares fit from CIELAB space into CMY space was chosen. That is, using well-known least squares fitting techniques, coefficients $c_0$ through $c_{19}$, $m_0$ through $m_{19}$, and $y_0$ through $y_{19}$ were derived to give the best fit, in the least squared sense, to the gamut measured in step S401:

$$\begin{aligned}C = &\ c_0 + c_1 L^* + c_2 a^* + c_3 b^* + c_4 L^{*2} + c_5 a^{*2} + \\ &\ c_6 b^{*2} + c_7 L^* a^* + c_8 L^* b^* + c_9 a^* b^* + c_{10} L^{*3} + \\ &\ c_{11} a^{*3} + c_{12} b^{*3} + c_{13} L^{*2} a^* + c_{14} L^* a^{*2} + \\ &\ c_{15} L^{*2} b^* + c_{16} L^* b^{*2} + c_{17} a^{*2} b^* + c_{18} a^* b^{*2} + \\ &\ c_{19} L^* a^* b^* \end{aligned} \quad (1)$$

$$\begin{aligned}M = &\ m_0 + m_1 L^* + m_2 a^* + m_3 b^* + m_4 L^{*2} + m_5 a^{*2} + \\ &\ m_6 b^{*2} + m_7 L^* a^* + m_8 L^* b^* + m_9 a^* b^* + m_{10} L^{*3} + \\ &\ m_{11} a^{*3} + m_{12} b^{*3} + m_{13} L^{*2} a^* + m_{14} L^* a^{*2} + \\ &\ m_{15} L^{*2} b^* + m_{16} L^* b^{*2} + m_{17} a^{*2} b^* + m_{18} a^* b^{*2} + \\ &\ m_{19} L^* a^* b^* \end{aligned} \quad (2)$$

$$\begin{aligned}Y = &\ y_0 + y_1 L^* + y_2 a^* + y_3 b^* + y_4 L^{*2} + y_5 a^{*2} + \\ &\ y_6 b^{*2} + y_7 L^* a^* + y_8 L^* b^* + y_9 a^* b^* + y_{10} L^{*3} + \\ &\ y_{11} a^{*3} + y_{12} b^{*3} + y_{13} L^{*2} a^* + y_{14} L^* a^{*2} + \\ &\ y_{15} L^{*2} b^* + y_{16} L^* b^{*2} + y_{17} a^{*2} b^* + y_{18} a^* b^{*2} + \\ &\ y_{19} L^* a^* b^* \end{aligned} \quad (3)$$

In step S402, any mathematical function which fits the measurements taken in step S401 from the device independent coordinate space to CMY coordinate space may be used. Preferably, however, the mapping function includes smoothing so as to eliminate measurement irregularities that may have been encountered in step S401.

It may, in addition, be preferable to weight some of the points measured in step S401 prior to deriving mappings in step S402. For example, proper skin tone color reproduction is an important property of color printers. Accordingly, it may be desirable, in some circumstances, to weight colors in the area of skin tone colors more heavily than other colors.

Figure 1:
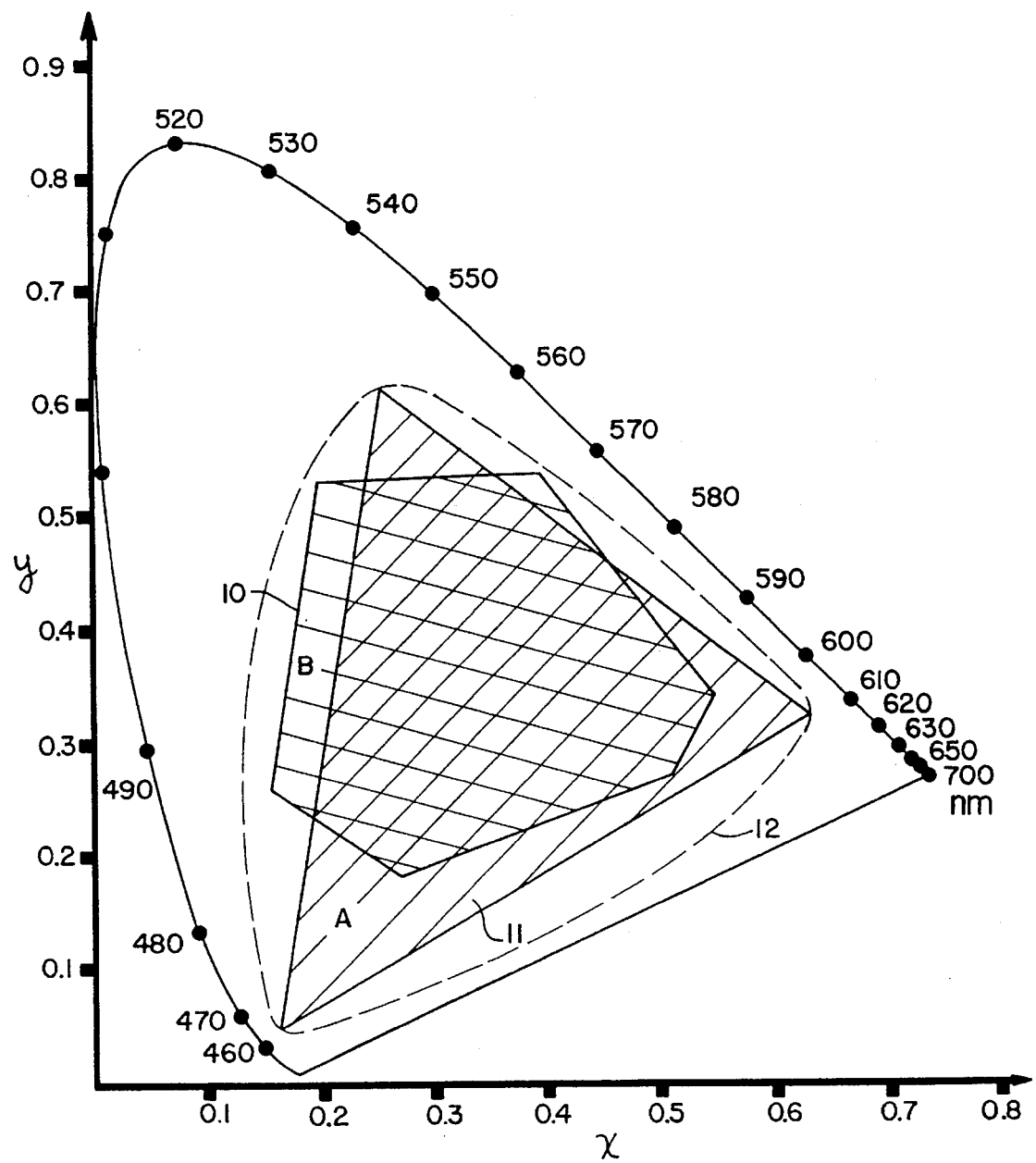
FIG. 1 is a chromaticity diagram showing how the gamut of colors printable on a printer is related to the gamut of colors displayable on a monitor.

In step S403, the device independent space, namely CIELAB space, is divided into equally sized intervals, one of the intervals including the L* axis such as by being centered at the L* axis, thereby providing a blank printer table. The size of the printer table preferably includes both the printer gamut as well as the gamut of a typical color monitor. For example, referring to FIG. 1, the printer table preferably includes the color area indicated generally at 12. The size of the intervals in the printer table should be made as small as possible giving due consideration to storage limitations for the printer table. Thus, for example, it has been found that fine luminance gradations are more important than fine hue and saturation gradations. It has been determined that dividing the luminance axis into intervals of $\Delta L^*=1$ (luminance L* ranges from 0 through 100) provides adequate luminance gradation. On the other hand, such fine gradations are not ordinarily needed in hue, and therefore $\alpha a^*=\alpha b,=3$ has been found to yield adequate hue gradations (a* and b* range from about −100 through +100 near the center (L*=50 of the luminance axis).

Figure 5:
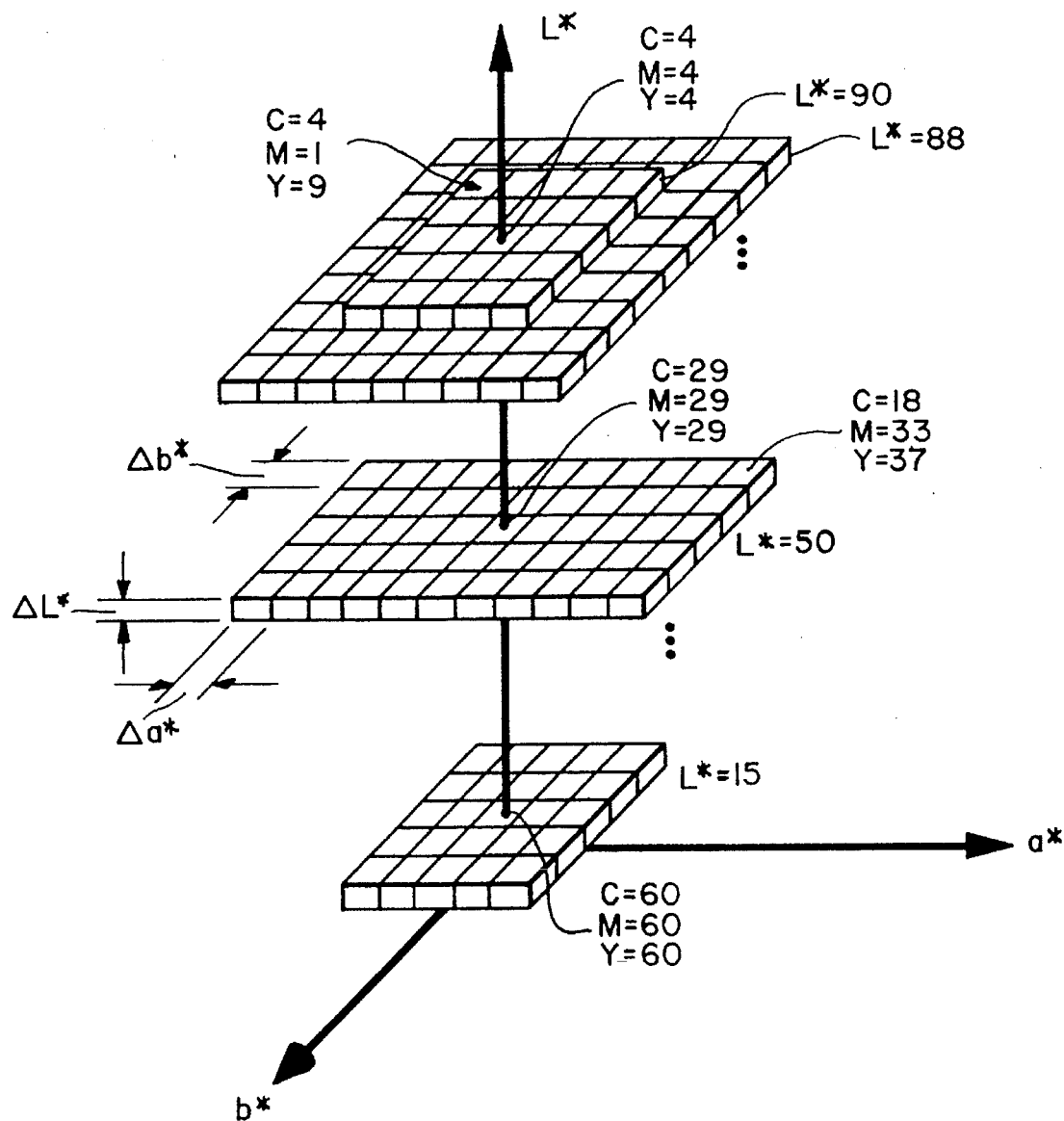
FIG. 5 illustrates a typical division of CIELAB space into a printer table.

In addition to the foregoing considerations, it should also be observed that the printer gamut is not the same for each luminance value. Specifically, the gamut is relatively smaller at luminance extremes and relatively larger at the center of the luminance axis. FIG. 5 illustrates a typical division of CIELAB space into a printer table, although all luminance and hue gradations have not been shown to simplify the presentation. At relatively low luminance values such as L*=10, a relatively small rectangular grid in the a* and b* axes is adequate to map the printer gamut. Similarly, at relatively high luminance values, such as L*=90, a relatively small rectangular grid in the a* and b* axes is also adequate to store the printer gamut. However, at intermediate luminance values, such as that at L*=50, a relatively larger rectangular grid in the a* and b* axes is required to map the printer gamut.

As further shown in FIG. 5, the rectangular grid at each luminance level includes the L* axis (in FIG. 5 it is centered on the L* axis). That is, there is a cell in the rectangular grid that corresponds exactly to a*=b*=0. That central point, namely a*=b*=0, corresponds to a pure gray color which, as mentioned above, is desirably reproduced as a pure gray color for proper color reproduction.

In practice, it is also preferable to include more colors in the printer table than are in the printer gamut, and most preferably also to include the colors that are found in a typical monitor's gamut. This permits the printer table to include transition values which smooth the transition from colors at the edge of the printer gamut to colors in the border table and which preserve color differentiation in areas outside the printer gamut.

In step S404, C, M and Y values are inserted into the printer table around the L* axis using the mapping functions derived in step S402. For digital color printing as opposed to continuous tone printing, fractional C, M and Y values are truncated or rounded to integral values. The entire rectangular grid at each luminance level is not completely filled, but rather only those points known to be within the printer gamut. In addition, the points exactly on the L* axis, namely those points at a*=b*=0, are also not mapped by the mapping functions. Rather, CMY values for those points are inserted in step S405 by determining printer grays measured in step S401 with corresponding L* values. This ensures that the smoothing introduced by the mapping functions does not introduce hue into pure gray values.

Figure 6:
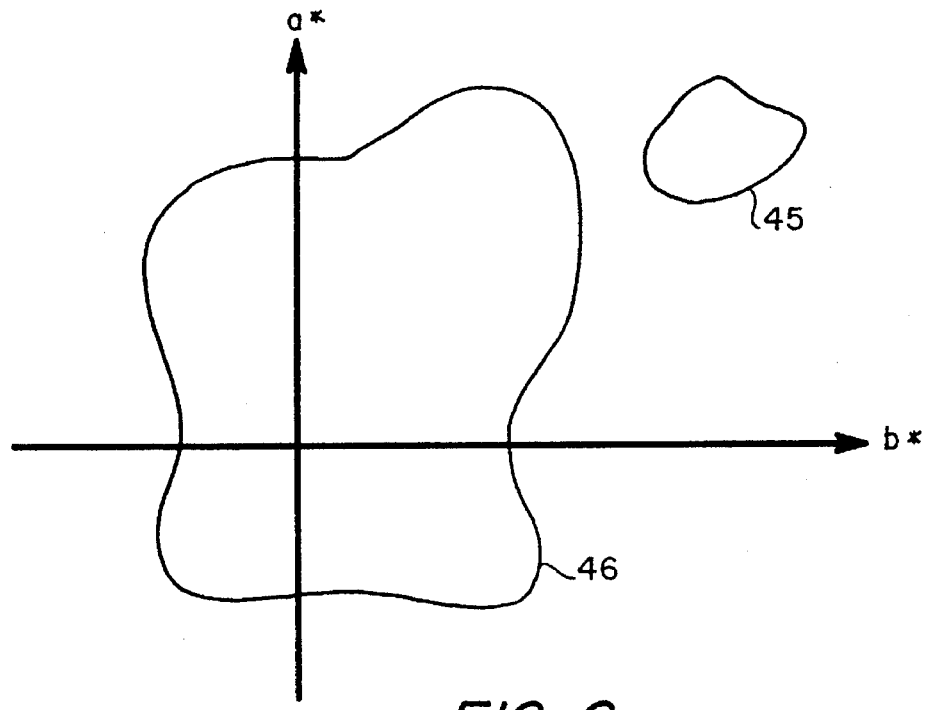
FIG. 6 shows how unconnected regions are removed from the printer table.

In steps S406 and S407, the CMY values in the printer table are adjusted for unprintable colors. Unprintable colors may arise because of artifacts introduced by the mapping function selected in step S402. For example, the mapping function used may give rise to false regions in the printer table, such as region 45 in FIG. 6, which is not within the printer gamut 46. These artifacts are removed in step S406 by removing all regions that are not connected to the region around the L* axis.

Figure 7:
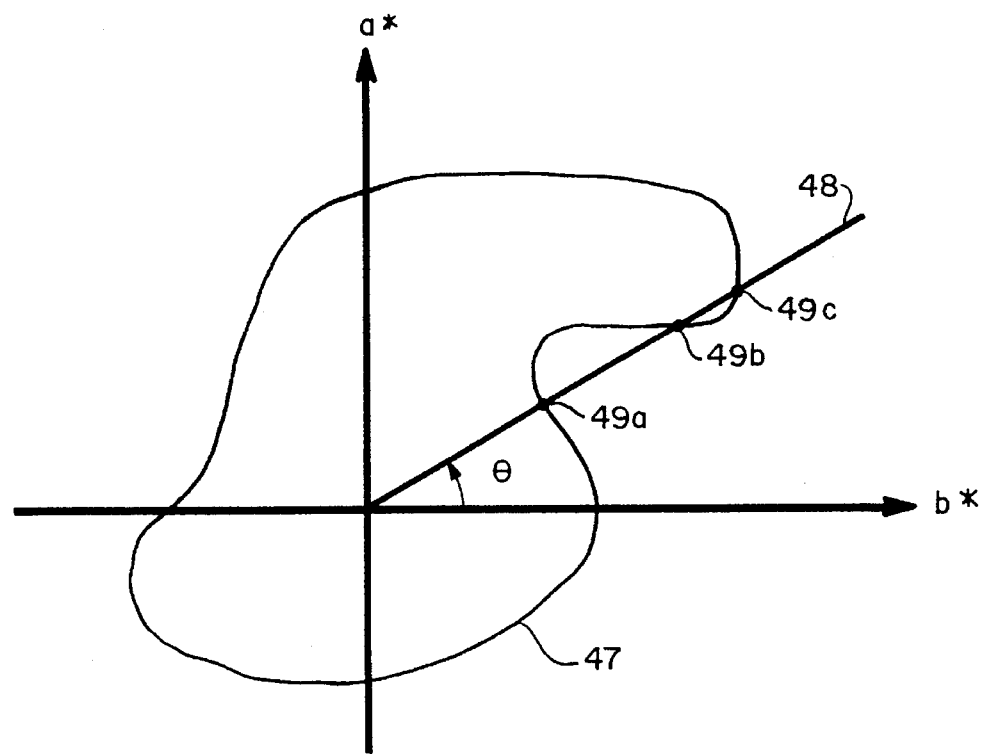
FIG. 7 shows radially concave regions in the printer gamut and FIG. 8 illustrates how to remove concavities by making the printer table radially convex.

Unprintable colors may also arise from the situation shown in FIG. 7 in which 47 designates the edge of the printer gamut for an arbitrary luminance value. L*. The printer gamut shown there is not radially convex because each and every radial line from the L* axis does not intersect edge 47 at one and only one point. In particular, radial line 48 intersects edge 47 at three points 49a, 49b and 49c. The region between points 49a and 49b is a radial concavity and can cause the generation of inappropriate CMY values in the printer table. Accordingly, in step S407, the values in the printer table are adjusted to make them radially convex.

Figure 8:
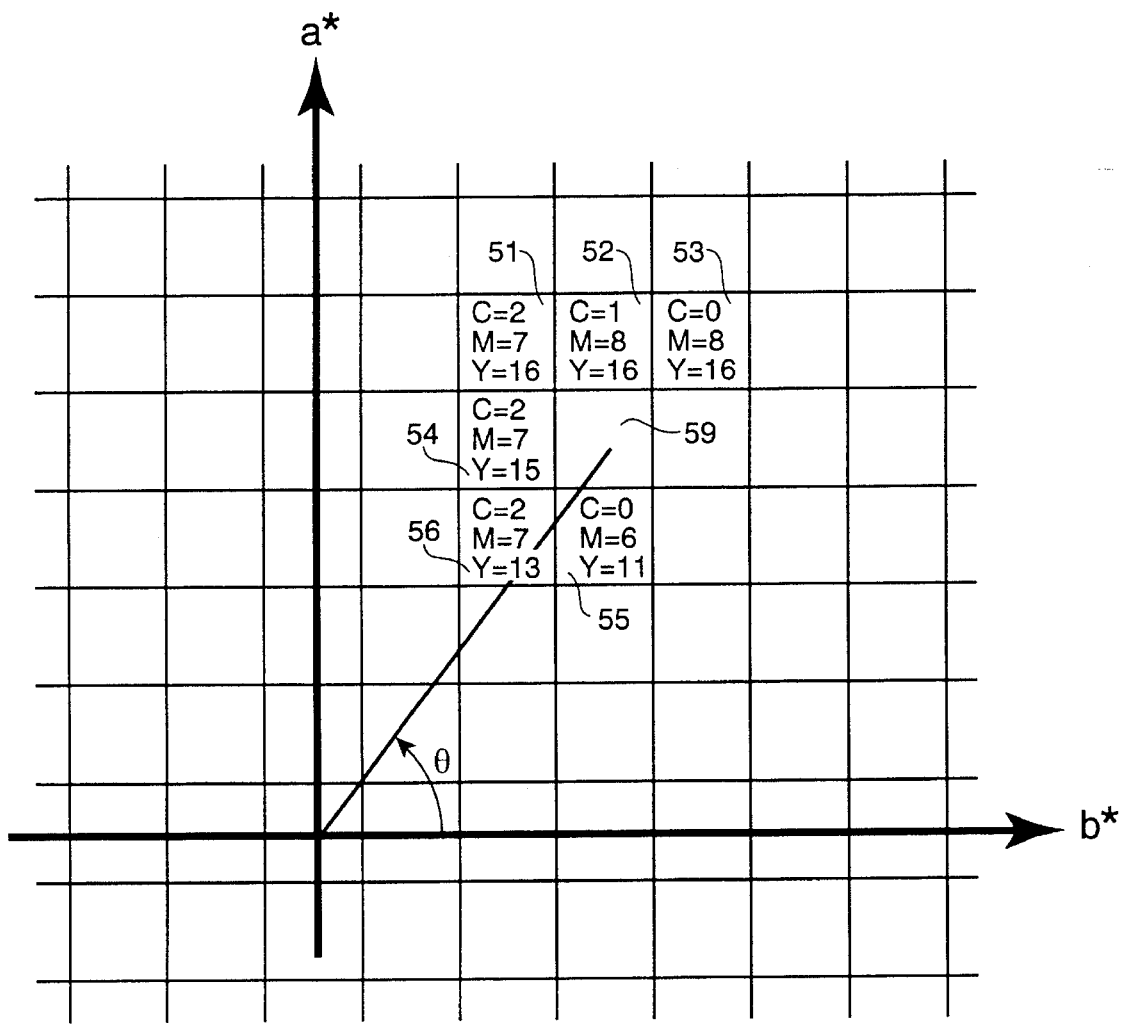

FIG. 8 illustrates this process. FIG. 8 shows the rectangular grid in the a* and b* axis for an arbitrary luminance value L*. Cells 51 through 56 all include printable values within the printer gamut. However, cell 59 is a radially concave cell because the radial line at θ crosses two cells in the printer gamut (cells 53 and 56). Accordingly, a CMY value is assigned to cell 59 to make the table radially convex. The value is selected by preserving as much as possible the hue of the color (angle θ in FIG. 8) and by selecting a saturation value which is nearest to that desired. Thus, in FIG. 8, the value of cell 59 could be assigned a value near to the value of one of cells 51 through 56 in dependence upon which of cells 51 through 56 have the closer values of hue and saturation. In FIG. 8, C=1, M=8 and Y=14 has been selected.

Figure 9:
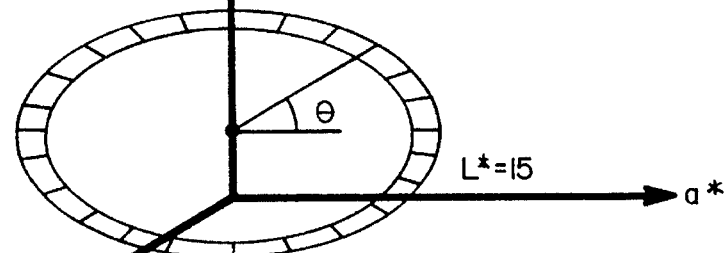
FIG. 9 illustrates the arrangement of border tables.

Step S408 derives the border table 26b. Whereas printer table 26a was arranged as a rectangular grid in the a*, b* axes for each luminance value, the border table is arranged in wheels with one wheel for each of the luminance values of the printer table. Thus, as shown in FIG. 9, a wheel-shaped border table is provided for each of the luminance values for which a printer table exists, which provides one border table in correspondence with each of the printer tables. The border tables contain plural cells which are accessed based on hue angle θ calculated as a function of the a* and b* coordinates, as follows:

$$\theta = \arctan(b^*/a^*)$$

Figure 10:
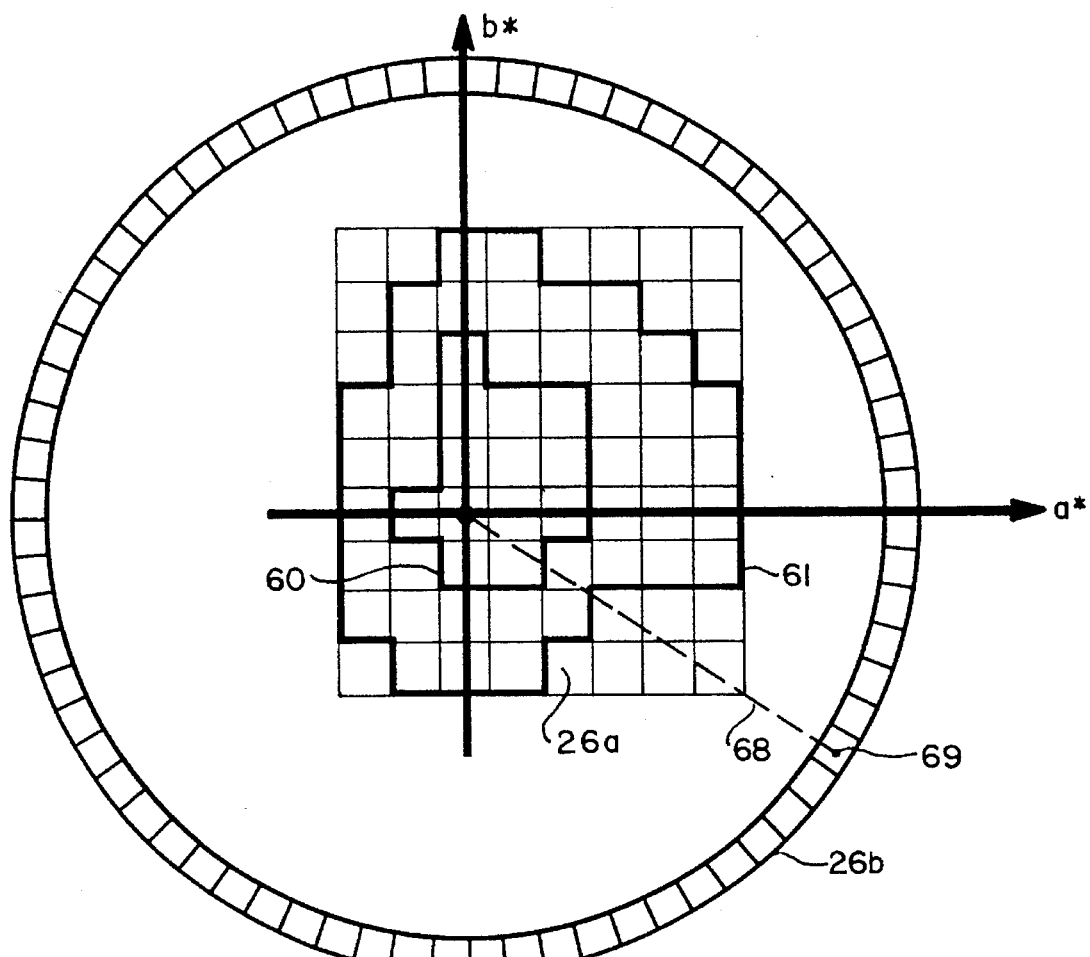
FIG. 10 shows the relation between the printer table and the border table in CIELAB space for an arbitrary luminance value L*.

FIG. 10 shows the correspondence of border tables and printer tables. Whereas printer table 26a is a rectangular grid for an arbitrary luminance value L*, border table 26b is arranged as a wheel centered at a*=b*=0. Individual cells in the border table are accessed by the angle θ in the a* and b* axes which also corresponds to hue. Experimentally, it has been found that 1 degree increments, resulting in 360 cells in each border table, provides adequate gradation of hue, but this can be adjusted as described below in connection with FIG. 12.

Figure 11A:
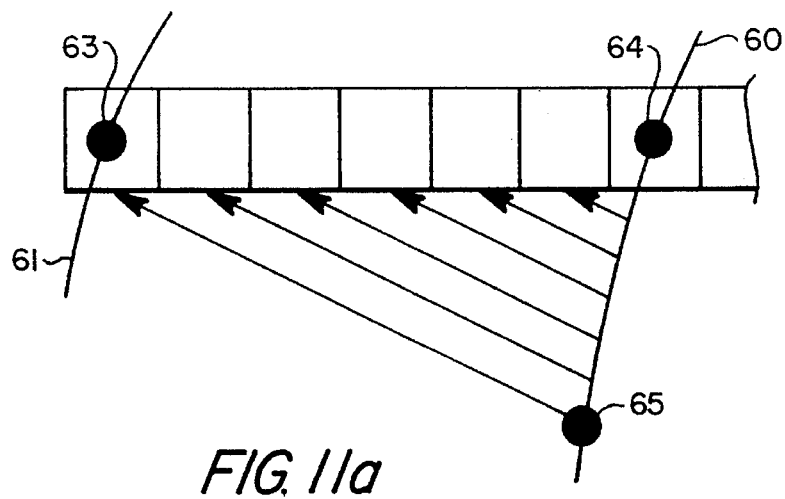
FIG. 11 shows how CMY values are selected for each cell in the border tables and FIG. 11a shows how transition values are added to the printer table.
Figure 11:
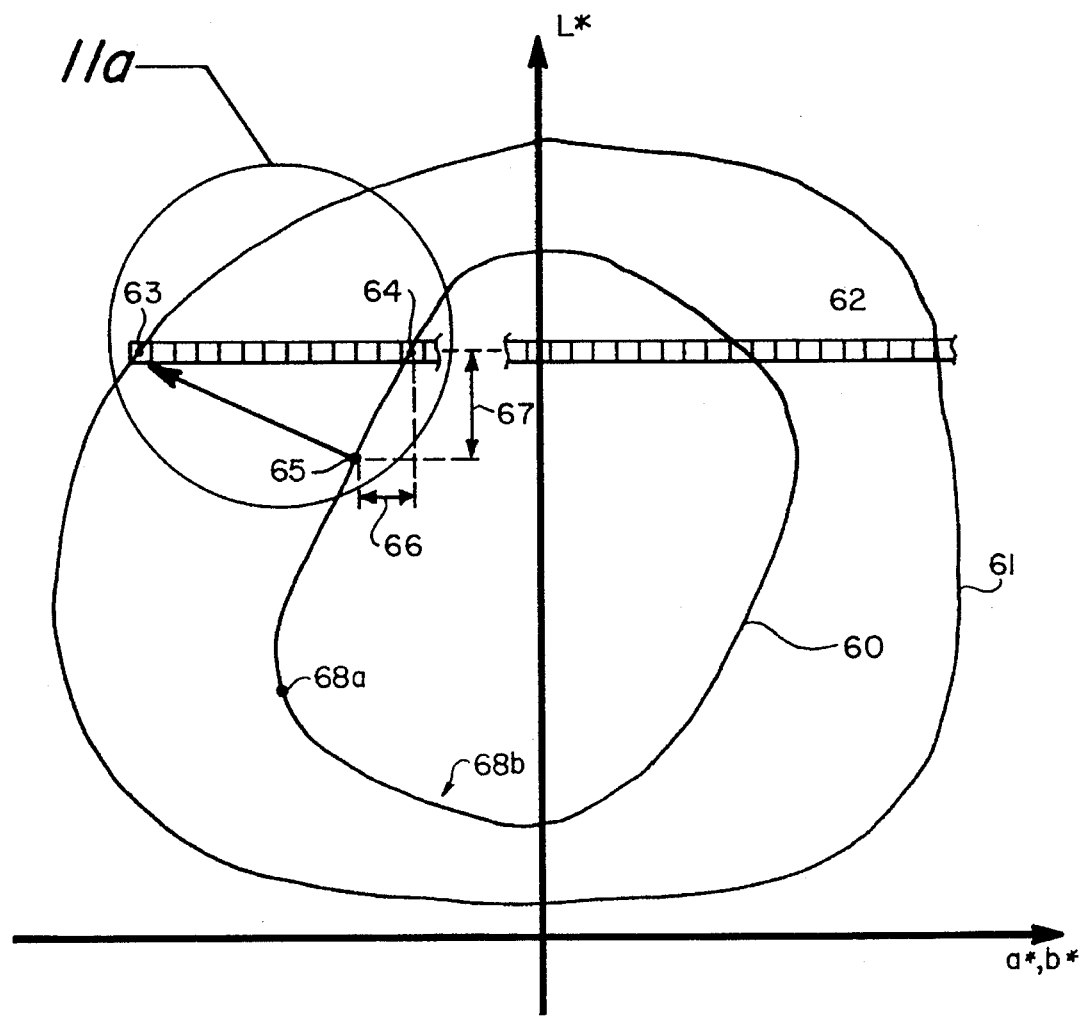

FIG. 11 shows how CMY values are selected for each cell in the border tables. In FIG. 10, 60 represents the gamut of the printer in an arbitrary hue plane θ. 61 corresponds roughly to the gamut of a typical color monitor. A printer table 26a for an arbitrary luminance value L* is designated by 62. 63 represents a color in CIELAB space which is outside of the printer table and for which appropriate CMY values for the border table must be selected. First, the CMY values are selected such that the color printed preserves the hue of color 63. That is, it is desired not to change hue, which most individuals perceive as "color" even though the precise color 63 is not possible to print. The CMY values may also be selected such that the color printed for unprintable color 63 also preserves luminance. That is, it is impossible to substitute the CMY values for the color at point 64, which lies at the edge of the printer gamut, whenever it is desired to print color 63. However, preserving luminance by selecting point 64 results in a significant decrease in color saturation, especially at the extremes of the L* axis. Accordingly, a better choice for unprintable color 63 is represented by the CMY values for point 65. Point 65 is a color on the edge of printer gamut 60 which increases saturation (represented by distance 66) without changing luminance (as shown by distance 67) by more than a predetermined amount. Experimentally, it has been found that limiting the change 67 in luminance to five luminance steps provides a desirable increase in color saturation without adversely affecting the perceived luminance.

Other limits may also apply in selecting the color whose CMY values are stored in the border table. For example, near the fully saturated point 68a it may not be possible to change the luminance by the full threshold amount without undesirably decreasing saturation, and a varying threshold may be needed near fully saturated points so as to avoid the possibility of decreasing saturation. Also, where the printer gamut edge 60 is close to the edge 61 of the printer table, like region 68b, it may be possible to select an edge color from the printer gamut whose saturation exceeds that of the unprintable color, even though luminance has been changed only by the threshold amount. In that case, the threshold should be limited so that the saturation of the selected color does not exceed that of the unprintable color.

In summary, step S408 derives the border table by selecting a more highly saturated edge color from the printer gamut of the same hue whose luminance does not differ by more than a threshold value, here 5, from the luminance of the unprintable colors.

Figure 12:
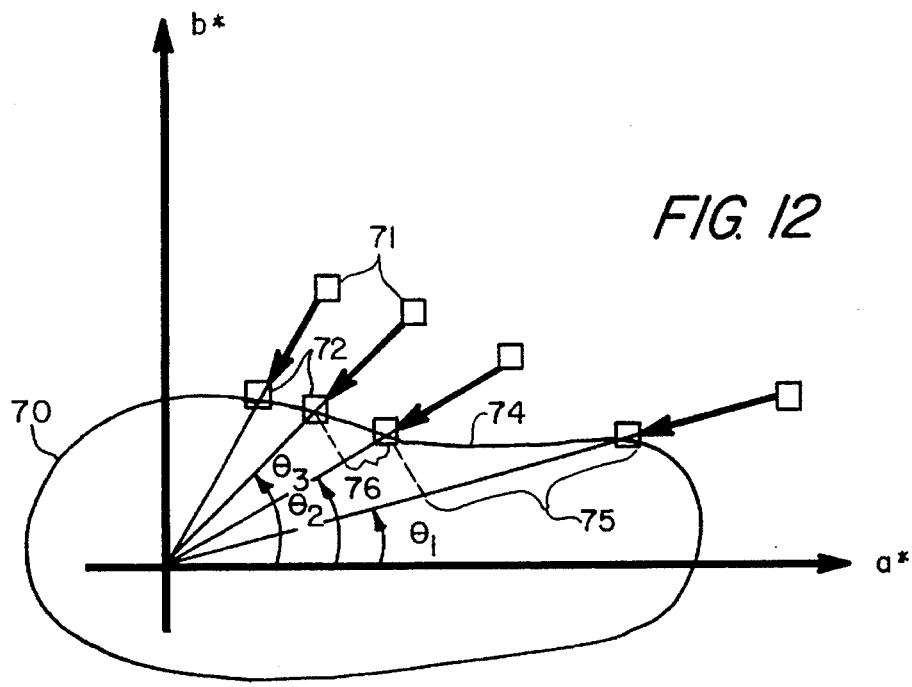
FIG. 12 the printer gamut at an arbitrary luminance value L* in the a* and b* axes.

In step S409, the border table values are inspected to ensure that the saturation of the colors in the border table changes smoothly. This situation is illustrated in FIG. 12 which shows the printer gamut 70 at an arbitrary luminance value L* in the a* and b* axes. As described above, colors such as color 71 which lie outside of the printer gamut are mapped to border color 72 of the printer gamut by preserving hue angle. Particularly in areas like area 74 where the printable saturation changes rapidly, small changes in hue can cause rapid changes in saturation in the border table. For example, as the hue angle changes from $\theta_1$ to $\theta_2$, there are relatively large changes in saturation for only a small change in hue. Such a large change in saturation, when printed, looks unnatural.

To avoid this unnatural look, the border table is increased in size until there are sufficiently fine increments to ensure that saturation changes smoothly. If the border table size is increased, then the calculations in step S408 are repeated to fill in CMY values for the new border table.

In step S410, transition CMY values are added to the periphery of the printer table. Specifically, as a result of steps S404 through S407, the rectangular grid at each luminance value was not completely filled but rather only the grid within the actual printer gamut (such as shown at 60 in FIGS. 10 and 11) was filled. Step S410 adds transition colors, that is, colors between areas 60 and 61, to smooth the transition from the printer gamut to the border tables and to preserve color differentiation. These values are calculated by interpolating, for example by linear interpolation, the values between points 64 and 65 as shown in FIG. 11a. This results in CMY values for the transition region which have the same hue and whose luminance value changes smoothly from the value at the edge of the printer gamut 60 to the value in the border table. This in turn provides color values which are perceived as faithful reproductions of displayed colors since color differentiation is preserved.

In step S411, the CMY values in the printer table are inspected and modified so as to ensure that they merge smoothly into the gray (L* axis). Specifically, at each discrete luminance level, the colors in the printer table that are close to the L* axis are redetermined so as to ensure that they converge smoothly to gray.

In step S412, the printer table is rectangularized. More specifically, until this step, CMY values have been inserted into the printer table only in areas within the printer gamut 60 (steps S404 and S405) and in the transition region 61 between the printer gamut and the border table (step S409). In step S412, the remaining cells of the printer table such as cells like 69 in FIG. 10 are filled out by calculating the hue angle for each blank cell that remains in the printer table and by inserting the border table color at that hue angle as illustrated at 68 in FIG. 10.

A computer program for automatically performing the foregoing steps S401 through S412 has been developed and is attached hereto in the form of a microfiche appendix.

What is claimed is:

1. A printer driver for providing color output values to a color printer in response to input color coordinates, said printer driver comprising:

a memory for storing a printer table and a border table, the printer table being comprised by a rectangular grid in input color coordinate space that includes the gray axis, the printer table providing color output values in response to color coordinates within a gamut of the color printer, and the border table providing color output values in response to color coordinates outside the printer table; and means for selecting exactly one of the printer table and the border table in accordance with whether input color coordinates are within the printer table or outside the printer table.

2. A printer driver according to claim 1, wherein the printer table includes transition values between colors within the color printer gamut and colors in the border table.

3. A printer driver according to claim 2, wherein the printer table includes values for colors within the color printer gamut and for colors within a gamut for a color monitor.

4. A printer driver according to claim 3, wherein within the color printer gamut the printer table provides color output values for accurate color reproduction and outside the color printer gamut the printer table provides color output values that preserve color differentiation.

5. A printer driver according to claim 1, wherein the border table is comprised by a wheeled cells centered on the gray axis in the input color coordinate space.

6. A printer driver according to claim 5, wherein border colors are accessed based on hue angle.

7. A printer driver according to claim 1, wherein the border table provides color output values for colors that are more highly saturated than corresponding colors of the same lightness on the printer gamut edge.

8. A printer driver according to claim 1, further comprising means for compressing luminance values in the input color coordinate space.

9. A printer driver according to claim 8, wherein compressed values are stored in the printer table and the border table.

10. A printer driver according to claim 1, further comprising means for converting RGB color coordinates displayed on a color monitor into the input color coordinate space whereby the color image displayed on said monitor is printed on said printing apparatus.

11. A method for building a printer table and a border table which provide printer color output values in response to colors input in an input color coordinate system, said method comprising the steps of:

measuring printable colors in the input color coordinate system;

fitting a mathematically smooth mapping function to the printable colors measured in said measuring step, said mapping function for mapping from the input color coordinate system to the printer color coordinate system;

calculating printer table values for colors within a printer gamut based on the mapping function; and calculating border table values for colors outside the printer table.

12. A method according to claim 11, wherein said measuring step is comprised by sampling all printable colors.

13. A method according to claim 12, wherein the sampling is around one quarter of the printable colors for each output color.

14. A method according to claim 11, wherein said fitting step comprises the step of performing a least squares fit from the input color coordinate system to the printable colors measured in said measuring step.

15. A method according to claim 14, wherein the input coordinate system is the CIELAB coordinate system and wherein the least squares fit is comprised by a cubic fit in the L*, a* and b* axes.

16. A method according to claim 11, wherein printer table values are calculated separately for values near the gray axis of the color coordinate system and for values at the gray axis of the color coordinate system.

17. A method according to claim 16, further comprising the step of merging colors near the gray axis into the gray levels at the gray axis.

18. A method according to claim 11, wherein said printer table calculating step includes the step of removing unconnected regions.

19. A method according to claim 11, wherein said printer table calculating step includes the step of removing radial concavities from the printer table.

20. A method according to claim 11, further comprising the step of calculating transition values between colors within the printer gamut and colors in the border table.

21. A method according to claim 20, further comprising the step of storing transition values in the printer table.

22. A method according to claim 20, wherein said transition values are calculated to have the same hue as the transition color based on interpolation between colors at the edge of the printer gamut and colors in the border table.

23. A method according to claim 20, further comprising the step of increasing the saturation of the transition values.

24. A method according to claim 23, further comprising the step of increasing the saturation of the transition value but limiting the change in luminosity to a predetermined threshold level.

25. A method according to claim 11, wherein said border table calculating step comprises the step of providing a border color having the same hue as the unprintable color.

26. A method according to claim 25, further comprising the step of increasing the saturation of the border table color.

27. A method according to claim 26, further comprising the step of limiting the luminance change to less than a predetermined threshold.

28. A method for building a printer table which provides color output values in response to colors input in an input color coordinate system, said method comprising the steps of:

measuring printable colors in the input color coordinate system;

fitting a mathematically smooth mapping system from the input color coordinate system to the printer color coordinate system based on the colors measured in said measuring step; and calculating printer table values based on said mapping function.

29. A method according to claim 28, wherein said measuring step is comprised by sampling all printable colors.

30. A method according to claim 29, wherein the sampling is around one quarter of the printable colors for each output color.

31. A method according to claim 28, wherein said fitting step comprises the step of performing a least squares fit from the input color coordinate system to the colors measured in said measuring step.

32. A method according to claim 31, wherein the input coordinate system is the CIELAB coordinate system and wherein the least squares fit is comprised by a cubic fit in the L*, a* and b* axes.

33. A method according to claim 28, wherein printer table values are calculated separately where values near the gray axis of the color coordinate system and for values at the gray axis of the color coordinate system.

34. A method according to claim 33, further comprising the step of merging colors near the gray axis into the gray levels at the gray axis.

35. A method according to claim 28, wherein said printer table calculating step includes the step of removing unconnected regions.

36. A method according to claim 28, wherein said printer table calculating step includes the step of removing radial concavities from the printer table.

37. A method according to claim 28, further comprising the step of calculating transition values between the printable colors and colors at the edge of a color monitor gamut.

38. A method according to claim 37, further comprising the step of storing transition values in the printer table.

39. A method according to claim 37, wherein said transition values are calculated to have the same hue as the transition color.

40. A method according to claim 39, further comprising the step of increasing the saturation of the transition values.

41. A method according to claim 40, further comprising the step of increasing the saturation of the transition color but limiting the change in luminosity to a predetermined threshold level.

42. A method for building a border table which provides color output values in response to colors input in an input color coordinate system to a printer color coordinate system, said method comprising the steps of:

measuring printable colors in the input color coordinate system;

determining the edge of a printer gamut based on the measurements in said measuring step; and calculating border table values for printer values outside the printer gamut based on the values at the edge of the gamut.

43. A method according to claim 42, wherein said measuring step is comprised by sampling all printable colors.

44. A method according to claim 43, wherein the sampling is around one quarter of the printable colors for each color.

45. A method according to claim 42, wherein said border table calculating step comprises the step of providing a border color having the same hue as the unprintable color.

46. A method according to claim 45, further comprising the step of increasing the saturation of the border table color.

47. A method according to claim 46, further comprising the step of limiting the luminance change to less than a predetermined threshold.

48. A color printing method comprising the steps of:
storing a printer table and a border table, the printer table being comprised by a rectangular grid in input color coordinate space that includes the gray axis, the printer table providing color output values in response to color coordinates within a gamut of a color printer, and the border table providing color output values in response to color coordinates outside the printer table; and
selecting exactly one of the printer table and the border table in accordance with whether input color coordinates are within the printer table or outside the printer table.

49. A method according to claim 48, wherein the printer table storing step includes the step of storing transition values between colors within the color printer gamut and colors in the border table.

50. A method according to claim 49, wherein the printer table includes values for colors within the color printer gamut and for colors within a gamut for a color monitor.

51. A method according to claim 50, wherein within the color printer gamut the printer table stores color output values for accurate color reproduction and outside the color printer gamut the printer table stores color output values that preserve color differentiation.

52. A method according to claim 51, wherein in said selecting step border colors are accessed based on hue angle.

53. A method according to claim 52, wherein the border table provides color output values for colors that are more highly saturated than corresponding colors of the same lightness on the printer gamut edge.

54. A method according to claim 48, wherein the border table storing step includes the step of storing wheeled cells centered on the gray axis in the input color coordinate space.

55. A method according to claim 48, further comprising the step of compressing luminance values in the input color coordinate space.

56. A method according to claim 55, wherein compressed values are stored in the printer table and the border table.

57. A method according to claim 48, further comprising the step of converting RGB color coordinates displayed on a color monitor into the input color coordinate space whereby the color image displayed on said monitor is printed.

58. An apparatus for building a printer table and a border table which provide color output values in response to colors input in an input color coordinate system, said apparatus comprising:
fitting means for fitting a mathematically smooth mapping function to measurements of printable colors, the mapping function for mapping from the input color coordinate system; and
calculating means for calculating printer table values for colors within a printer gamut based on the mapping function, and for calculating border table values for colors outside the printer table.

59. An apparatus according to claim 58, wherein said measurements are comprised by a sample of all printable colors.

60. An apparatus according to claim 59, wherein the sample is around one quarter of the printable colors of the output colors.

61. An apparatus according to claim 58, wherein said fitting means performs a least squares fit from the input color coordinate system to the measurements of printer gamut.

62. An apparatus according to claim 61, wherein the input coordinate system is the CIELAB coordinate system and wherein the least squares fit is comprised by a cubic fit in the L*, a* and b* axes.

63. An apparatus according to claim 61, wherein printer table values are calculated separately for values near the gray axis of the color coordinate system and for values at the gray axis of the color coordinate system.

64. An apparatus according to claim 61, wherein said calculating means merges colors near the gray axis into the gray levels at the gray axis.

65. An apparatus according to claim 58 wherein said calculating means removes unconnected regions in the printer table.

66. An apparatus according to claim 58 wherein said calculating means removes radial concavities from the printer table.

67. An apparatus according to claim 58, further comprising second calculating means for calculating transition values between colors within the printer gamut and colors in the border table.

68. An apparatus according to claim 67, wherein transition values are stored in the printer table.

69. An apparatus according to claim 67, wherein said transition values are calculated to have the same hue as the transition color based on interpolation between colors at the edge of the printer gamut and color in the border table.

70. An apparatus according to claim 69, wherein the saturation of the transition values is increased.

71. An apparatus according to claim 67, wherein said second calculating means includes means for increasing the saturation of the transition values but limiting the change in luminosity to a predetermined threshold level.

72. An apparatus according to claim 71, wherein the luminance change in border colors is limited to less than a predetermined threshold.

73. An apparatus according to claim 58, wherein said calculating means calculates border colors for the border table with the same hue as the unprintable color.

74. An apparatus according to claim 73, wherein the saturation of border colors is increased.

75. An apparatus for building a printer table which provides color output values in response to colors input in an input color coordinate system, said apparatus comprising:
fitting means for fitting a mathematically smooth mapping system for mapping from the input color coordinate system to the printer color coordinate system based on measurements of printable colors; and
calculating means for calculating printer table values within a printer gamut based on said mapping function.

76. An apparatus according to claim 75, wherein said measurements are comprised by a sample of all printable colors.

77. An apparatus according to claim 76, wherein the sample is around one quarter of the printable colors for each output color.

78. An apparatus according to claim 75, wherein said fitting means fits a least squares fit from the input color coordinate system to the measurements of color printer gamut.

79. An apparatus according to claim 78, wherein the input coordinate system is the CIELAB coordinate system and wherein the least squares fit is comprised by a cubic fit in the L*, a* and b* axes.

80. An apparatus according to claim 75, wherein printer table values are calculated separately for values near the gray axis of the color coordinate system and for values at the gray axis of the color coordinate system.

81. An apparatus according to claim 80, wherein colors near the gray axis are merged into the gray levels at the gray axis.

82. An apparatus according to claim 75, wherein said calculating means removes unconnected regions in the printer table.

83. An apparatus according to claim 75, wherein said calculating means removes radial concavities from the printer table.

84. An apparatus according to claim 75, further comprising second calculating means for calculating transition values between colors within the printer gamut and colors in the border table.

85. An apparatus according to claim 84, wherein transition values are stored in the printer table.

86. An apparatus according to claim 85, wherein the saturation of the transition color is increased but the change in luminosity is limited to a predetermined threshold level.

87. An apparatus according to claim 84, wherein said transition values are calculated to have the same hue as the transition color.

88. An apparatus according to claim 87, wherein the saturation of the transition values is increased.

89. An apparatus for building a border table which provides color output values in response to colors input in an input color coordinate system, said apparatus comprising:

determining means for determining the edge of a color printer gamut based on the measurements of the color printer gamut; and calculating means for calculating border table values for printer values outside the printer gamut based on the values at the edge of the gamut.

90. An apparatus according to claim 89, wherein said measurements are comprised by a sample of all printable colors.

91. An apparatus according to claim 90, wherein the sample is around one quarter of the printable colors for each output color.

92. An apparatus according to claim 89, wherein said calculating means provides a border table value having the same hue as the unprintable color.

93. An apparatus according to claim 92, wherein the saturation of the border table value is increased.

94. An apparatus according to claim 93, wherein the luminance change is limited to less than a predetermined threshold.

* * * * *

UNITED STATES PATENT AND TRADEMARK OFFICE
CERTIFICATE OF CORRECTION

PATENT NO. : 5,500,921

DATED : March 19, 1996

INVENTOR(S) : Brigitte Ruetz

It is certified that error appears in the above-identified patent and that said Letters Patent is hereby corrected as shown below:

On the title page, item [56]:

In "FOREIGN PATENT DOCUMENTS", the following information should be added:

```
 321983    6/1989    European Patent Off.
 488655    6/1992    European Patent Off.
2213674    8/1989    United Kingdom
```

COLUMN 3:

Line 34, "the" should read --shows the--.

COLUMN 7:

Line 16, "$\alpha a*=\alpha b,=3$" should read --$\Delta a*=\Delta b*=3$--.

COLUMN 10:

Line 52, "a" should be deleted.

UNITED STATES PATENT AND TRADEMARK OFFICE
CERTIFICATE OF CORRECTION

PATENT NO. : 5,500,921

DATED : March 19, 1996

INVENTOR(S) : Brigitte Ruetz

Page 2 of 2

It is certified that error appears in the above-identified patent and that said Letters Patent is hereby corrected as shown below:

COLUMN 12:

Line 26, "where" should read --for--.

Signed and Sealed this

Third Day of September, 1996

Attest:

BRUCE LEHMAN

Attesting Officer

Commissioner of Patents and Trademarks